(12) United States Patent
Christensen et al.

(10) Patent No.: US 11,722,350 B2
(45) Date of Patent: Aug. 8, 2023

(54) SYSTEMS AND METHODS FOR SYNCHRONIZE WORD CORRELATION

(71) Applicant: L3Harris Technologies, Inc., Melbourne, FL (US)

(72) Inventors: L. Carl Christensen, South Jordan, UT (US); Ihab Francis, South Jordan, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 64 days.

(21) Appl. No.: 17/526,387

(22) Filed: Nov. 15, 2021

(65) Prior Publication Data

US 2023/0155877 A1 May 18, 2023

(51) Int. Cl.
*H04L 27/26* (2006.01)

(52) U.S. Cl.
CPC ...... *H04L 27/2663* (2013.01); *H04L 27/2671* (2013.01)

(58) Field of Classification Search
CPC .................. H04L 27/2663; H04L 27/2671
See application file for complete search history.

(56) References Cited

U.S. PATENT DOCUMENTS

2020/0210894 A1\* 7/2020 Mimura ................... G06N 5/02
2020/0313844 A1\* 10/2020 Arslan .................. H04L 25/067

\* cited by examiner

*Primary Examiner* — David B Lugo
(74) *Attorney, Agent, or Firm* — Fox Rothschild LLP (57) ABSTRACT

Systems and methods for synchronize word correlation. The methods comprise: obtaining first values that each indicate a likelihood or probability that a respective timeslot in a symbol timing window of a carrier wave is meant or expected to include energy; multiplying, by the correlator, the first values respectively by correlation coefficients to produce a plurality of products (wherein at least one of the correlation coefficients comprises a negative coefficient value); generating a correlation value by combining the products together; determining whether a synchronization word has been detected with a given amount of likelihood based on the correlation value; and causing symbol timing synchronization at a receiver when a determination is made that the synchronization word has been detected with the given amount of likelihood based on the correlation value.

20 Claims, 10 Drawing Sheets

SYSTEMS AND METHODS FOR SYNCHRONIZE WORD CORRELATION

BACKGROUND

Statement of the Technical Field

The present document concerns computer systems and communication systems. More specifically, the present document concerns systems and methods for synchronize word correlation in communication applications.

Description of the Related Art

Digital data can be serially communicated in a data stream by interconnected electronic devices, i.e., data bits are communicated one-by-one in a sequential manner over a single data transfer link. Pulse Position Modulation (PPM) may be employed to encode the digital data stream onto an optical carrier wave. The encoding is achieved by modulating the optical carrier wave such that the digital data bits are conveyed through variations in a time relationship between optical pulses.

The datastream can be transferred as discrete frames of information from the transmitting device to the receiving device. Thus, the receiving device may also perform frame synchronization by determining a location of a sync word within the received data stream. The sync word comprises a fixed pattern of bits inserted into a header of each frame by the transmitting device. This determination is made by matching the fixed pattern of bits in the received signal to a reference pattern of bits. The pattern matching may be achieved using a cross-correlation technique on the detected bits. When PPM is used to encode the digital bits onto the optical carrier wave, the cross-correlation technique can perform poorly due to the low duty cycle of pulses in the PPM encoded signal. In particular, the differences in correlation values between a match and random data can be small and difficult to detect.

SUMMARY

This document concerns systems and methods for synchronize word correlation. The methods comprise: obtaining, by a correlator, first values that each indicate a likelihood or probability that a respective timeslot in a symbol timing window of a carrier wave is meant or expected to include energy; multiplying, by the correlator, the first values respectively by correlation coefficients to produce a plurality of products (wherein at least one of the correlation coefficients comprises a negative coefficient value); generating, by the correlator, a correlation value by combining the products together; determining, by the correlation, whether a synchronization word has been detected with a given amount of likelihood based on the correlation value; and causing, by the correlator, symbol timing synchronization at a receiver when a determination is made that the synchronization word has been detected with the given amount of likelihood based on the correlation value.

The negative coefficient value is used in the multiplying when energy should not be present in the respective timeslot of the symbol timing window. Thus, the correlation coefficient having the negative value causes the correlation value to be penalized when carrier wave energy exists in a timeslot that should not have any carrier wave energy. At least another one of the correlation coefficients comprises a positive coefficient value. The positive coefficient value is used in the multiplying when energy should be present in the respective timeslot of the symbol timing window. An absolute value of the positive coefficient value is greater than an absolute value of the negative coefficient value. A distance between the positive coefficient value and the negative coefficient value is equal to or greater than three.

The determining comprises comparing the correlation value to a threshold value. A determination is made that the synchronization word has been detected with the given amount of likelihood when the correlation value is exceeds the threshold value. A determination is made that the synchronization word has not been detected with the given amount of likelihood when the correlation value is less than the threshold value.

The implementing system can comprise a processor and a non-transitory computer-readable storage medium comprising programming instructions that are configured to cause the processor to implement a method for mitigating interference. Alternatively or additionally, the implementing system may include logic circuits (e.g., subtractors), passive circuit components (e.g., resistors, capacitors, switches, delays, etc.) and/or other active circuit components (e.g., transistors, demodulators, modulators, combiners, etc.).

BRIEF DESCRIPTION OF THE DRAWINGS

This disclosure is facilitated by reference to the following drawing figures, in which like numerals represent like items throughout the figures.

DETAILED DESCRIPTION

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

The present solution will be described herein in relation to optical communication systems. The present solution is not limited in this regard, and can be used with other types of communication systems such as Radio Frequency (RF) communication systems employing PPM.

Figure 1:
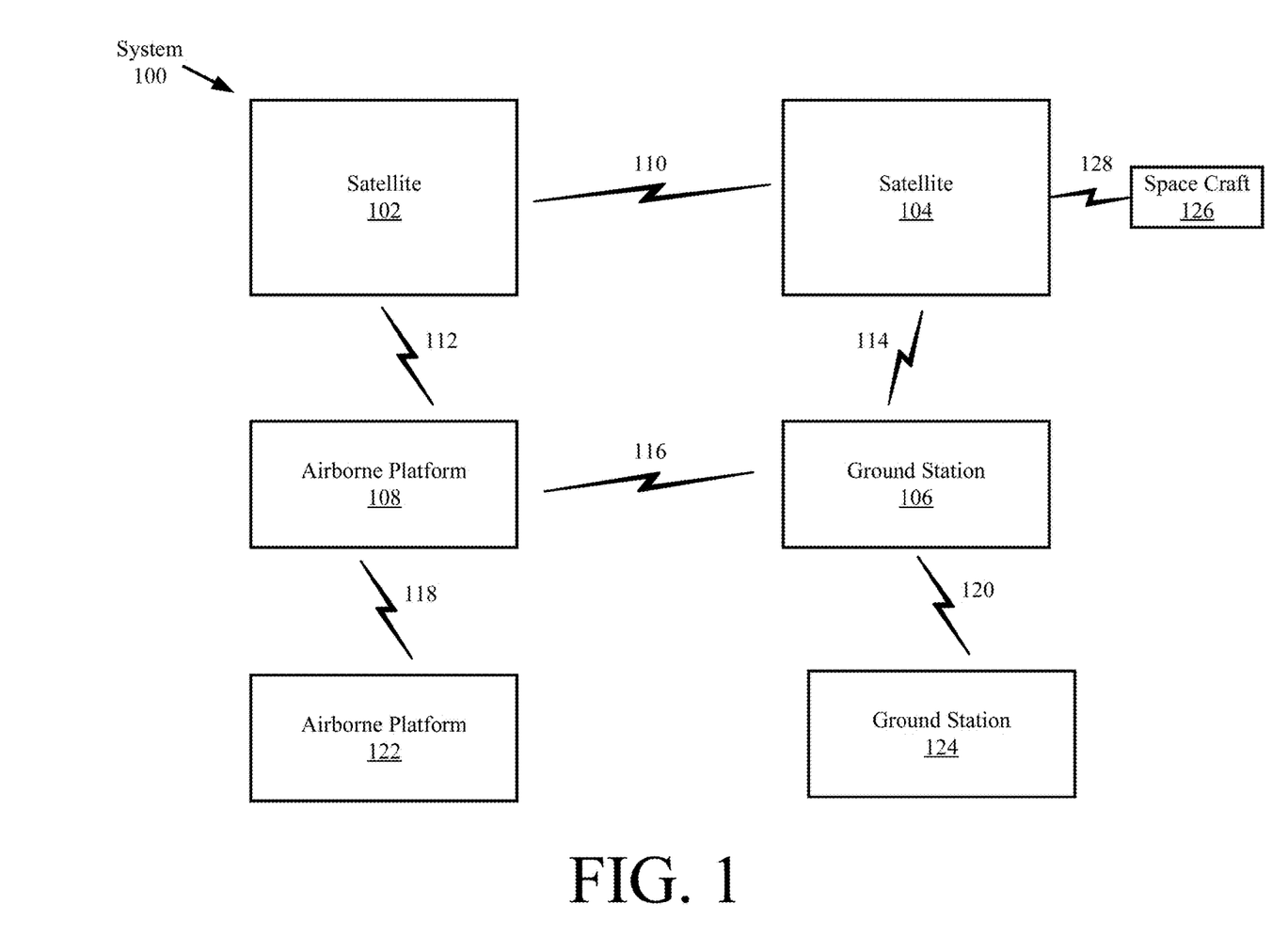
FIG. 1 provides an illustration of a system.

Referring now to FIG. 1, there is provided an illustration of a system 100 implementing the present solution. System 100 comprises satellites 102, 106, ground station(s) 107, 124, airborne platform(s) 108, 122, and spacecraft 126. The listed devices are configured to communicate with each other over communication links 110, 112, 114, 116, 118, 120, 128. As such, each of these devices 102-108 comprises a communication device configured to transmit and receive signals. An illustrative architecture for a communication device is provided in FIGS. 2-3, which will be discussed in detail below.

During operation, the communication devices serially communicate digital data in data streams, i.e., data bits are communicated one-by-one in a sequential manner over a single data transfer link 110, 112, 114, 116, 118, 120 or 128. PPM may be employed by the communication devices to encode the digital data stream onto optical carrier waves. The encoding is achieved by modulating the optical carrier waves such that the digital data bits are conveyed through variations in a time relationship between optical pulses.

The datastream can be transferred as discrete frames of information from a transmitting device (e.g., satellite 102) to a receiving device (e.g., airborne platform 108). Thus, the receiving device may also perform frame synchronization by determining locations of a sync word within the received data stream. The sync word comprises a fixed pattern of bits inserted into a header of each frame by the transmitting device. This determination is made by matching the fixed pattern of bits in the received signal to a reference pattern of bits. The pattern matching may be achieved using a cross-correlation technique on the detected bits.

The cross-correlation technique employed here is improved as compared to that of conventional cross-correlation techniques such that the synchronization pattern is detected with a higher degree of confidence when PPM or other modulation technique is used to encode the digital bits onto an optical carrier wave. In particular, the differences in correlation values between a match and random data is no longer difficult to detect as a result of the novel cross-correlation technique employed in system 100. The particulars of the novel cross-correlation technique will become evident as the discussion progresses.

Figure 2:
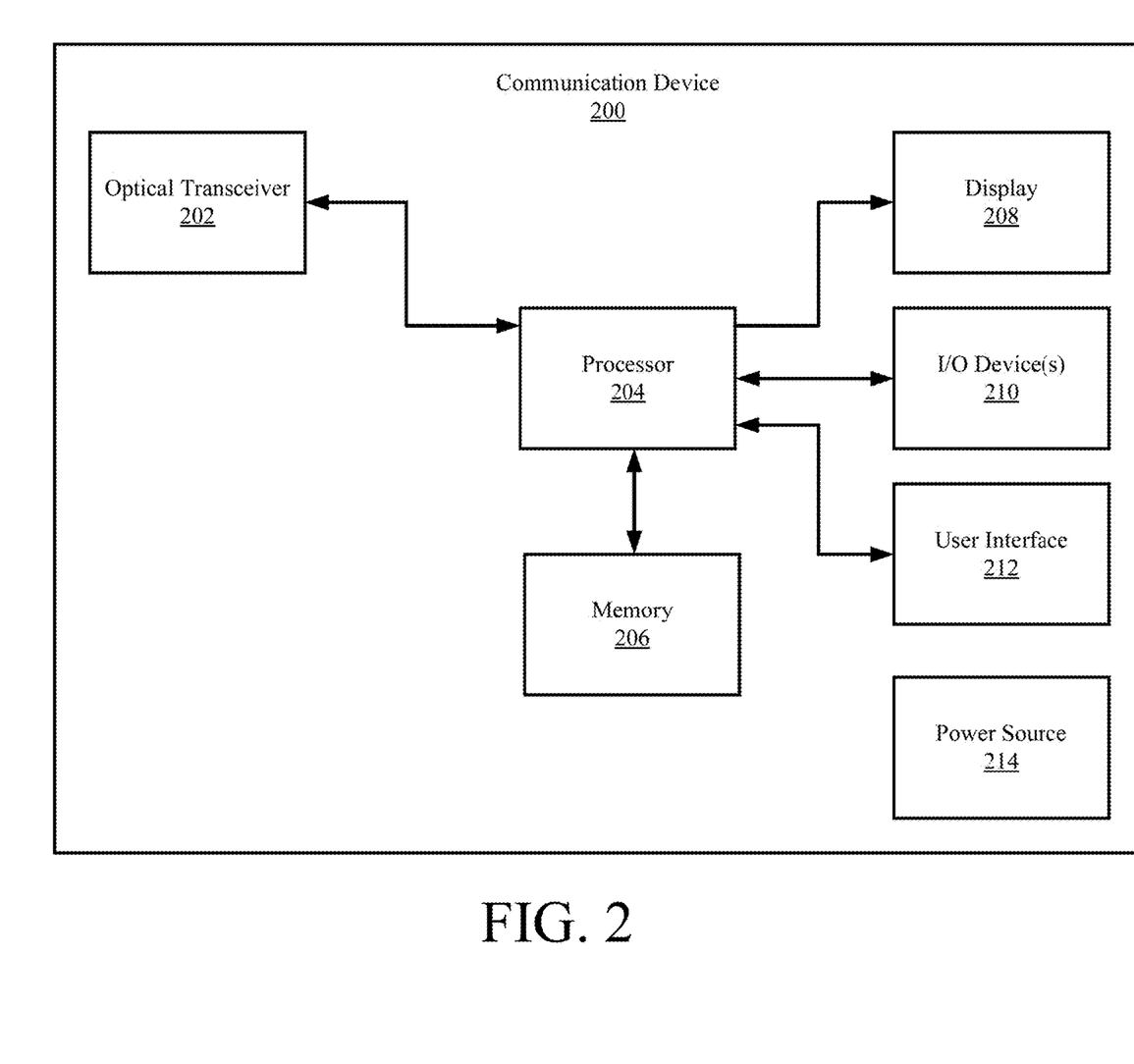
FIG. 2 provides an illustration of a communication device.

An illustrative communication device is provided in FIG. 2 which is configured for carrying out the various methods described herein for synchronize word correlation in communication applications. Satellites 102, 104, ground station 106 and/or airborne platform 108 can comprise communication device 200 of FIG. 2. Communication device 200 can include more or less components than that shown in FIG. 2 in accordance with a given application. For example, communication device 200 can include one or both components 208 and 210. The present solution is not limited in this regard.

As shown in FIG. 2, the communication device 200 comprises an optical transceiver 202, a processor 204, a memory 206, a display 208, Input/Output (I/O) device(s) 210, user interface 212, and a power source 214. The optical transceiver 202 can comprise one or more components such as a processor, an application specific circuit, a programmable logic device, a digital signal processor, or other circuit programmed to perform the functions described herein. The optical transceiver 202 can enable end-to-end communication services in accordance with the present solution. In this regard, the optical transceiver can facilitate communication of data (e.g., voice data and/or media content) from the communication device 200 over a network and/or communications channel (e.g., a satellite communication channel).

The optical transceiver 202 can include, but is not limited to, an optical wireless transceiver and an optical wireless receiver. The optical wireless transceiver 302 is generally configured to convert electrical data signals into optical signals. The optical wireless transceiver 302 is connected to a processor 204 comprising an electronic circuit. During operation, the processor 204 is configured to control the optical wireless transceiver 202 for providing communication services. The processor 204 also facilitates clock synchronization at a receiving device by including a synchronization word at the start of each frame of data and facilitates clock synchronization at the optical wireless receiver by detecting the synchronization word in received signals.

A memory 206, display 208, user interface 212 and I/O device(s) 210 are also connected to the processor 204. The processor 204 may be configured to collect and store data generated by the I/O device(s) 210 and/or external devices (not shown). The I/O device(s) 210 can include, but are not limited to, a speaker, a microphone, sensor(s) (e.g., a temperature sensor and/or a humidity sensor), and/or a camera. Data stored in memory 206 can include, but is not limited to, one or more look-up tables or databases which facilitate synchronize word correlation in communication applications. The user interface 212 includes, but is not limited to, a plurality of user depressible buttons that may be used, for example, for entering numerical inputs and selecting various functions of the communication device 200. This portion of the user interface may be configured as a keypad. Additional control buttons and/or rotatable knobs may also be provided with the user interface 212. A power source 214 (e.g., a battery) may be provided for powering the components of the communication device 200. The power source 200 may comprise a rechargeable and/or replaceable battery. Batteries are well known in the art, and therefore will not be discussed here.

The communication device architecture shown in FIG. 2 should be understood to be one possible example of a communication device system which can be used in connection with the various implementations disclosed herein. However, the systems and methods disclosed herein are not limited in this regard and any other suitable communication device system architecture can also be used without limitation. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the illustrative system is applicable to software, firmware, and hardware implementations.

Figure 3:
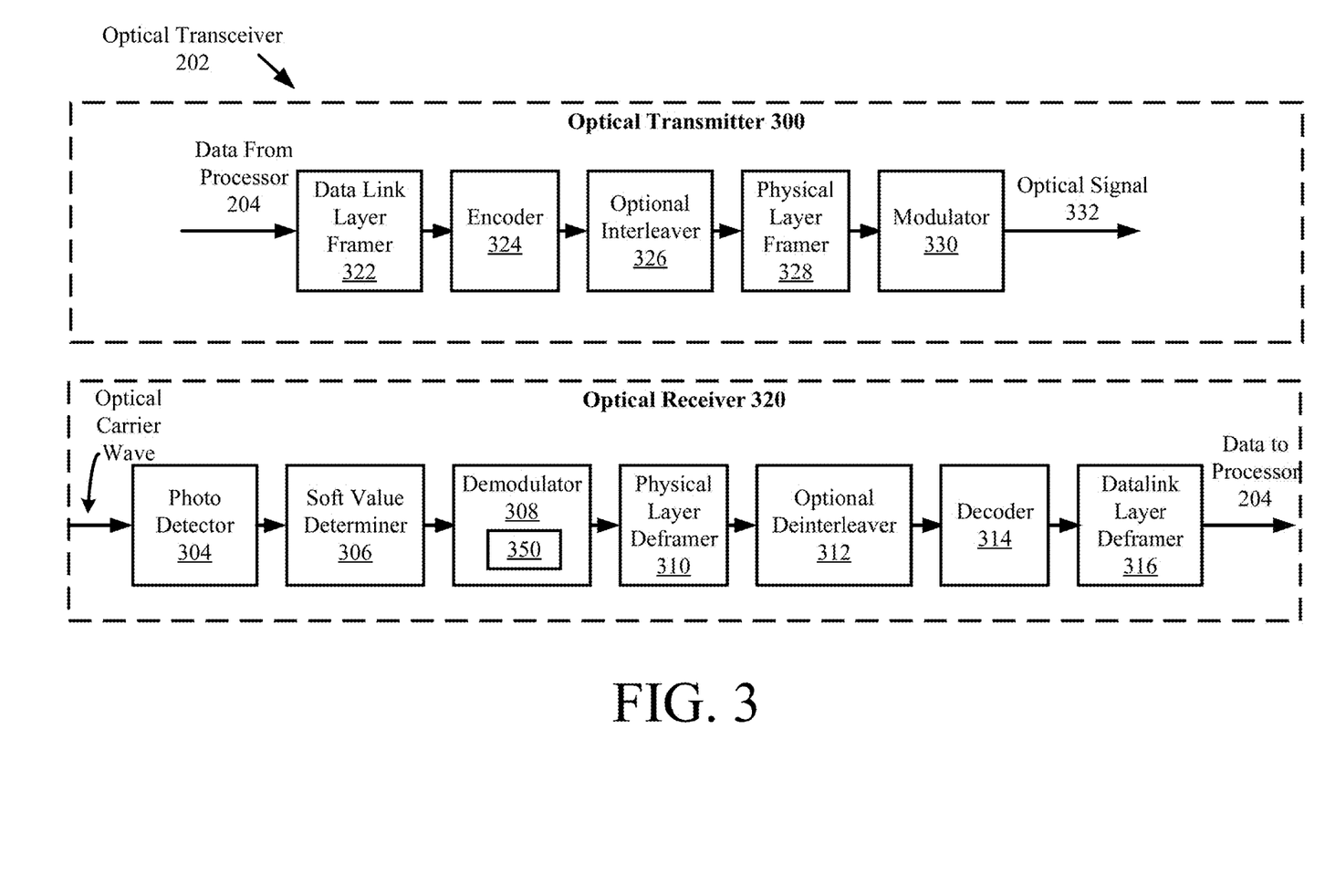
FIG. 3 provides an illustration of an optical transceiver.

Referring now to FIG. 3, there is provided a more detailed diagram of the optical transceiver 202 of FIG. 2. As noted above, the optical transceiver 202 comprises an optical transmitter 300 and an optical receiver 320. The transmitter 300 is configured to receive data from processor 204 and process the same to generate an optical signal 332. The processing is performed by a data link layer framer 322, an encoder 324, an optional interleaver 326, a physical layer framer 328 and a modulator 330.

Figure 4:
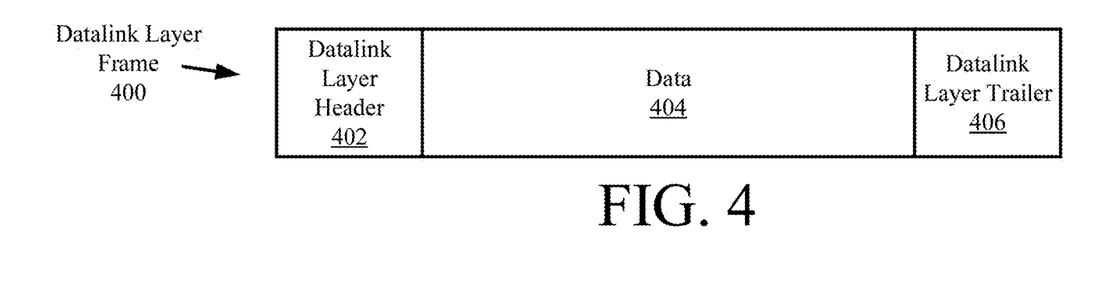
FIG. 4 provides an illustration of a data link layer frame.

The data link layer framer 322 is generally configured to generate data link layer frames. An illustration of a data link layer frame 400 is provided in FIG. 4. The data link layer frame 400 comprises a datalink layer header 402, data 404, and a data link layer trailer 406. Data link layer headers and trailers are well known. The header 402 may comprise a source address, a destination address, and/or control bytes. The trailer 404 may comprise information to ensure that the frame 400 is received intact and undamaged.

Figure 5:
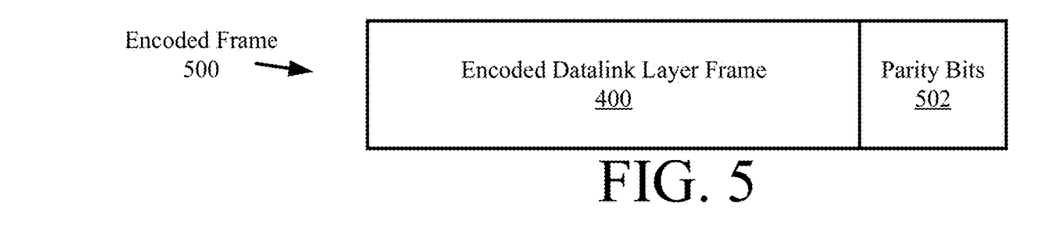
FIG. 5 provides an illustration of an encoded frame.

The data link layer frame 400 is then passed to the encoder 324. The encoder 324 performs operations to generate an encoded frame. An illustration of an encoded frame 500 is provided in FIG. 5. The encoded frame 500 comprises an encoded datalink layer frame 400 and parity bit(s) 502. The encoded datalink layer frame 400 comprises the datalink layer frame 400 which has been converted into a codeblock. The codeblock can include, but is not limited to, a Low-Density Parity-Check Code (LDPC) codeblock. LDPC is well known. Parity bits are well known as generally comprising one or more bits which act as check bit(s) for validating an integrity of the codeblock.

Figure 6:
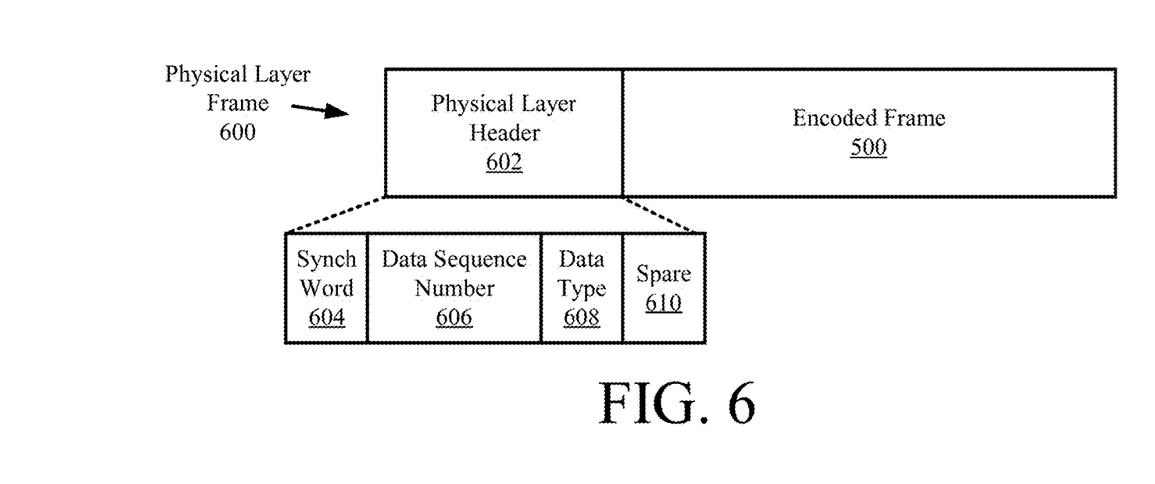
FIG. 6 provides an illustration of a physical layer frame.
Figure 7:
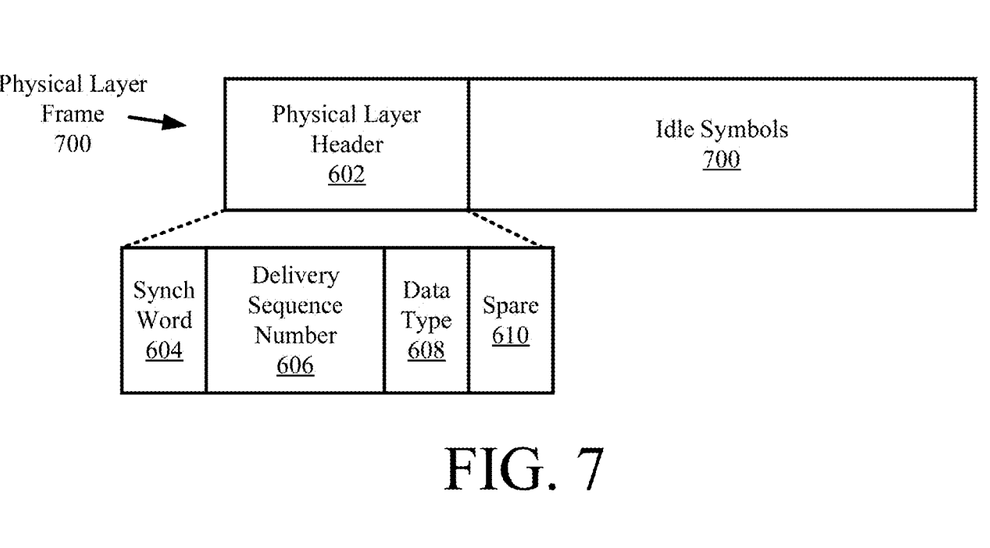
FIG. 7 provides an illustration of another physical layer frame.

The encoded frame 500 is then passed to the physical layer framer 328 via an optional interleaver 326. The physical layer framer 328 performs operations to generate a physical layer frame. An illustration of a physical layer frame 600 is provided in FIG. 6, and an illustration of another physical layer frame 700 is provided in FIG. 7. Both physical layer frames 600, 700 comprise a synchronization word 604, a data sequence number 606, a data type 608, and spare bit(s) 610. The synchronization word 604 comprises a sequence of bits which are known to a receiving device for facilitating synchronization of its clock with the clock of transmitter 300. The other components 606, 608, 610 are well known.

The physical layer frame is then passed to modulator 330. Modulator 330 is configured to perform modulation operations for modulating an optical carrier wave such that the digital data bits of the physical layer frame are conveyed. The modulation technique employed by modulator 330 can include, but is not limited to, PPM and/or other modulation schemes that have low duty cycles or in which the energized time is relatively small compared to the non-energized time (e.g., the energized time <10% of the time for the synchronization word and non-energized time is >90% of the total time for the synchronization word).

Figure 8:
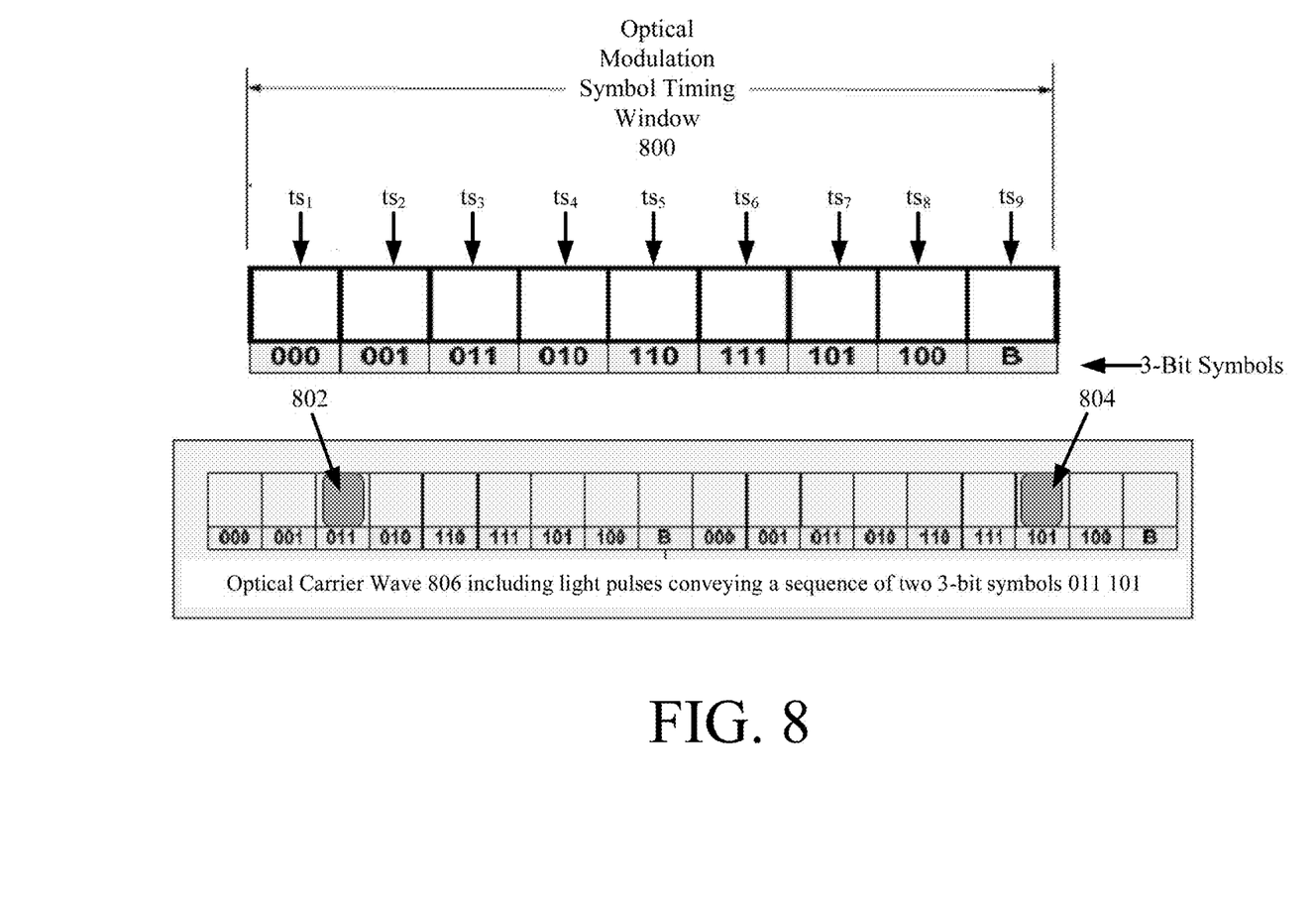
FIG. 8 provides an illustration that is useful for understanding PPM.

An illustration is provided in FIG. 8 that is useful for understanding PPM. In PPM, a digital data stream is encoded onto an optical carrier wave. The encoding is achieved by modulating the optical carrier wave such that the digital data bits are conveyed through variations in a time relationship between optical pulses. For example, a symbol timing window 800 comprises a plurality of timeslots $ts_1$, $ts_2$, $ts_3$, $ts_4$, $ts_5$, $ts_6$, $ts_7$, $ts_8$, $ts_9$ in which a symbol of a synchronization word can be transmitted via a light pulse. Each symbol comprises three bits and can have a value 000, 001, 011, 010, 110, 111, 101, 100. So, if the synchronization word comprise a sequence of symbols 011 101, then an optical carrier wave 806 is generated in which a light pulse 802 is provided in timeslot $ts_3$ of a first symbol timing window and a light pulse 804 is provided in timeslot $ts_7$ of a second symbol timing window. The present solution is not limited to the particulars of this example.

Referring back to FIG. 3, an optical carrier wave (e.g., optical carrier wave 806) can be received by the optical receiver 320. The optical carrier wave is processed by a photo detector 304 and the soft value determiner 306 to generate soft values for the timeslots of the symbol timing windows. The soft value determiner 306 can include, but is not limited to, an Analog-to-Digital Converter (ADC). Each soft value indicates a probability that the respective timeslot of a symbol timing window is meant or expected to include a light pulse. The soft values are provided to a correlator 350 which implements a novel correlation technique for timing synchronization. The particulars of the novel correlation technique will be discussed in detail below in relation to FIGS. 9-10. The novel correlation technique is performed to determine when the synchronization word has been detected with a given degree of likelihood. Once it is determined that the synchronization word has been detected with the given degree of likelihood, operations are performed by the demodulator 308 to demodulate the optical carrier wave for obtaining a data stream.

The correlator 350 is shown in FIG. 3 as being part of the demodulator 308. The present solution is not limited in this regard. The correlator 350 can be a separate device from the demodulator 308 and/or comprised in another device other than the demodulator 308.

The data stream is then passed to the physical layer deframer 310 where each physical layer frame is extracted from the data stream and processed to remove the physical layer header therefrom to obtain an encoded frame. The encoded frame is passed to the decoder 314 via an optional deinterleaver. At the decoder 314, the encoded frame is decoded to obtain the datalink layer frame. The datalink layer frame is passed to the data link layer deframer 316 where the data is extracted therefrom. The data is then provided to processor 204.

Figure 9:
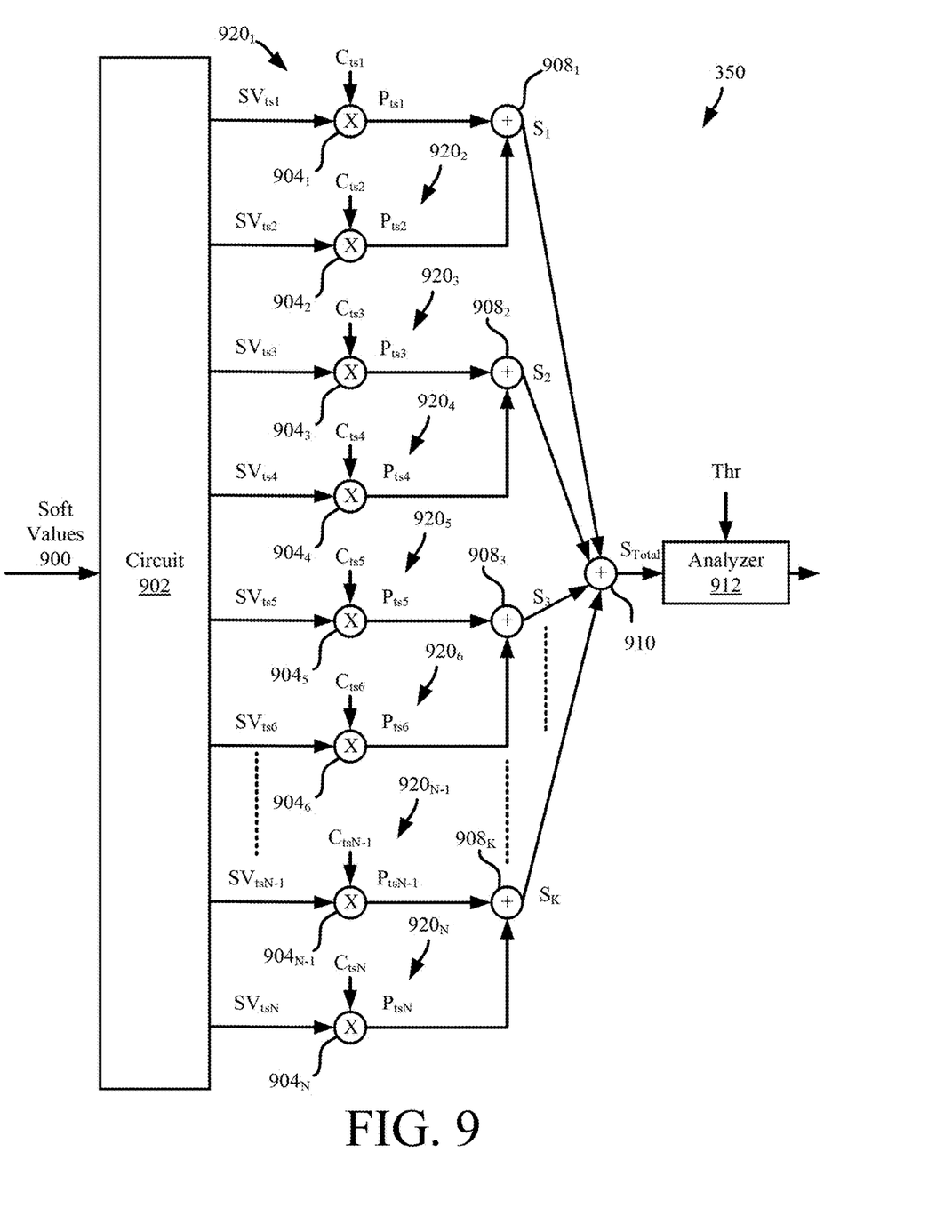
FIG. 9 provides an illustration that is useful for understanding operations performed by the demodulator of the receiver shown in FIG. 3 for clock synchronization.

Referring now to FIG. 9, there is provided an illustration that is useful for understanding the novel correlation technique implemented by correlator 350 of optical receiver 320. The correlator 350 is generally configured to correlate signal samples (or modulation window samples) against synchronization word coefficients. The correlation process may be iteratively performed using signal samples shifted once every sample time. For example, the signal samples $s_1$, $s_2$, $s_3$, ..., $s_N$ are evaluated in a first iteration of the correlation process. If the synchronization word is not detected in the first iteration, the signal samples are shifted such that signal samples $s_2$, $s_3$, ... $s_{N+}1$ are analyzed in a second iteration of the correlation processes. The correlation process increases the difference between correlation peaks and non-peaks compared to other correlation modes/schemes when using modulation schemes with relatively low duty cycles (e.g., modulation schemes where the energized time is smaller than the non-energized time). In such low duty cycle modulation schemes, the limited number of occupied timeslots cause other correlation modes/schemes to have little difference in correlation values for random data and correlation values for synchronization words.

The correlator 350 comprises a circuit 902 configured to receive the soft values 900 (e.g., from soft value determiner 306 of FIG. 3). The soft values 900 can be generated in accordance with any known technique such as via an ADC. The soft values 900 include a plurality of values $SV_{ts1}$, $SV_{ts2}$, $SV_{ts3}$, $SV_{ts4}$, $SV_{ts5}$, $SV_{ts6}$, ..., $SV_{tsN-1}$, $SV_{tsN}$. Each of the soft values indicates a likelihood or probability that the respective timeslot of the N timeslots (e.g., timeslots $ts_1$, $ts_2$, $ts_3$, $ts_4$, $ts_5$, $ts_6$, $ts_7$, $ts_8$, $t_9$ of FIG. 8) in a symbol timing window (e.g., symbol timing window 800 of FIG. 8) is or is not meant or expected to include light. For example, a soft value of zero indicates a likelihood or probability that the respective timeslot in a symbol timing window is not meant or expected to include light (or have a zero bit value associated therewith), while a soft value of ten indicates a likelihood or probability that the respective timeslot in a symbol timing window is meant or expected to include light (or have a non-zero bit value associated therewith). The present solution is not limited to the particulars of this example.

Circuit 902 performs operations to route or otherwise provide the soft values to the respective operational branch of a plurality of operational branches $920_1$, $920_2$, $920_3$, $920_4$, $920_5$, $920_6$, ..., $920_{N-1}$, $920_N$ (collectively referred to as "920"). Specifically, circuit 902 passes a soft value $SV_{ts1}$ (associated with a timeslot $ts_1$) to operational branch $920_1$, passes a soft value $SV_{ts2}$ (associated with a timeslot $ts_2$) to operational branch $920_2$, passes a soft value $SV_{ts3}$ (associated with a timeslot $t_{s3}$) to operational branch $920_3$, passes a soft value $SV_{ts4}$ (associated with a timeslot $ts_4$) to operational branch $920_4$, a soft value $SV_{ts5}$ (associated with a timeslot $ts_5$) to operational branch $920_5$, a soft value $SV_{ts6}$ (associated with a timeslot $ts_6$) to operational branch $920_6$, a soft value $SV_{tsN-1}$ (associated with a timeslot $ts_{N-1}$) to operational branch $920_{N-1}$, and a soft value $SV_{tsN}$ (associated with a timeslot $ts_N$) to operational branch $920_N$.

Each operational branch 920 comprises a multiplier $904_1$, $904_2$, $904_3$, $904_4$, $904_5$, $904_6$, ..., $904_{N-1}$, $904_N$ (collectively referred to as "904"). The multiplier is configured to multiply the soft value with a correlation coefficient. For example, multiplier $904_1$ is configured to multiply soft value $SV_{ts1}$ (associated with a timeslot $ts_1$) and coefficient $C_{ts1}$ (also associated with timeslot $ts_1$) to produce a product $P_{ts1}$. Multiplier $904_2$ is configured to multiply soft value $SV_{ts2}$ (associated with a timeslot $ts_2$) and coefficient $C_{ts2}$ (also associated with timeslot $ts_2$) to produce a product $P_{ts2}$. Multiplier $904_3$ is configured to multiply soft value $SV_{ts3}$ (associated with a timeslot $ts_3$) and coefficient $C_{ts3}$ (also associated with timeslot $ts_3$) to produce a product $P_{ts3}$. Multiplier $904_4$ is configured to multiply soft value $SV_{ts4}$ (associated with a timeslot $ts_4$) and coefficient $C_{ts4}$ (also associated with timeslot $ts_4$) to produce a product $P_{ts4}$. Multiplier $904_5$ is configured to multiply soft value $SV_{ts5}$ (associated with a timeslot $ts_5$) and coefficient $C_{ts5}$ (also associated with timeslot $ts_5$) to produce a product $P_{ts5}$. Multiplier $904_6$ is configured to multiply soft value $SV_{ts6}$ (associated with a timeslot $ts_6$) and coefficient $C_{ts6}$ (also associated with timeslot $ts_6$) to produce a product $P_{ts6}$. Multiplier $904_{N-1}$ is configured to multiply soft value $SV_{tsN-1}$ (associated with a timeslot $ts_{N-1}$) and coefficient $C_{tsN-1}$ (also associated with timeslot $ts_{N-1}$) to produce a product $P_{tsN-1}$. Multiplier $904_N$ is configured to multiply soft value $SV_{tsN}$ (associated with a timeslot $ts_N$) and coefficient $C_{tsN}$ (also associated with timeslot $ts_N$) to produce a product $P_{tsN}$.

The coefficients comprise a positive coefficient and a negative coefficient such that the correlation value ($S_{Total}$) is penalized when carrier wave energy exists when there should be none. The positive and negative coefficients are arbitrarily selected or selected in accordance with a given application (e.g., for optimized processing, processing time or resource intensity). The absolute value of the positive coefficient is greater than the absolute value of the negative coefficient, and the distance between the positive coefficient and the negative coefficient is equal to or greater than three. For example, the positive coefficient is positive eight, while the negative coefficient is negative two. The absolute value of positive eight is greater than the absolute value of negative two, and the distance between positive eight and negative two is ten which is greater than three. Alternatively, the positive coefficient is positive two while the negative coefficient is negative one. The absolute value of positive two is greater than the absolute value of negative one, and the distance between positive two and negative one is equal to three. The present solution is not limited to the particulars of these examples. The positive coefficient is employed as a coefficient in an operational branch when the associated timeslot should be an occupied timeslot, i.e., light or energy should be present in the timeslot. The negative coefficient is employed as a coefficient in an operational branch when the associated timeslot should be an unoccupied timeslot, i.e., light or energy should not be present in the timeslot.

The products $P_{ts1}$, ..., $P_{tsN}$ are then combined to generate a sum $S_{Total}$ thereof. In this regard, the correlator 350 comprises a plurality of adders $908_1$, $908_2$, $908_3$, ..., $908_K$ (collectively referred to as "908"), 910. Adder $908_1$ performs an addition operation using products $P_{ts1}$ and $P_{ts2}$ to produce sum $S_1$. Adder $908_2$ performs an addition operation using products $P_{ts3}$ and $P_{ts4}$ to produce sum $S_2$. Adder $908_3$ performs an addition operation using products $P_{ts5}$ and $P_{ts6}$ to produce sum $S_3$. Adder $908_K$ performs an addition operation using products $P_{tsN-1}$ and $P_{tsN}$ to produce sum $S_K$. Adder 910 performs an addition operation using sums $S_1$, $S_2$, $S_3$, ..., $S_K$ to produce sum $S_{total}$.

The sum $S_{Total}$ is then provided to an analyzer 912. In some scenarios, the analyzer 912 comprises a comparator. The comparator compares the sum $S_{Total}$ with a threshold value thr. If the sum $S_{Total}$ exceeds the threshold value thr, then a determination is made that the synchronization word has been detected with a given amount of likelihood. In this case, the transceiver sets its clocks and/or other timing parameters based on the detection. If the sum $S_{Total}$ is equal to or less than the threshold value thr, then a determination is made that the synchronization word has not been detected with a given amount of likelihood. In this case, another iteration of the correlation process is performed by correlator 350.

Additionally or alternatively, the analyzer 912 comprises a peak detector. The peak detector sets a threshold by sliding the values across the correlator to identify a largest correlation value or peak. The peak detector can be used in conjunction with an expected synchronization occurrence process. The expected synchronization occurrence process involves verifying a next synchronization word is located (occurs) in time when it is expected to. Given knowledge of the frame structure, the system knows how far apart the synchronization words are from each other. Often, the system counts N synchronization words in a row in the expected locations because declaring that the synchronization word has been detected.

Figure 10:
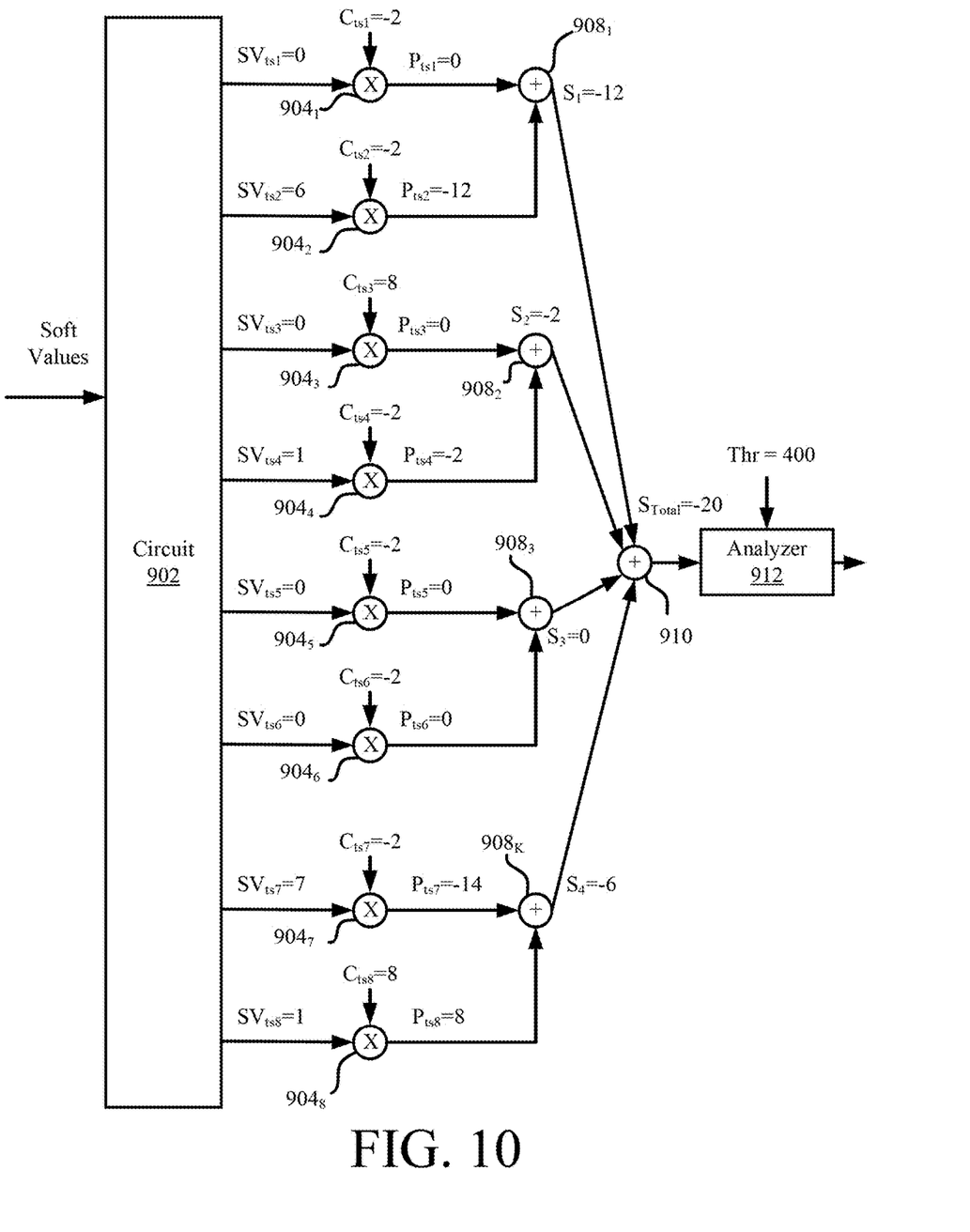
FIG. 10 provides an illustration that is useful for how clock synchronization is achieved in accordance with the present solution.

Referring now to FIG. 10, there is provided an illustration that is useful for understanding an exemplary scenario for correlator 350 described above in relation to FIG. 9. In this scenario, the synchronization word or pattern is 00100001. Each soft value falls within a range of zero to ten, where a value of zero indicates that that timeslot is least likely occupied with a light pulse and a value of ten indicates that the timeslot is most likely occupied with a light pulse. Specifically, the soft values comprise $SV_{ts1}$ having a value of zero, $SV_{ts2}$ having a value of six, $SV_{ts3}$ having a value of zero, $SV_{ts4}$ having a value of one, $SV_{ts5}$ having a value of zero, $SV_{ts6}$ having a value of zero, $SV_{ts7}$ having a value of seven, and $SV_{ts8}$ having a value of zero. The correlation coefficients have a value of negative two when the respective bit of the synchronization word or pattern is zero, and a value of eight when the bit of the synchronization word or pattern is one. Since the synchronization word or pattern is 00100001, the correlation values comprise: $C_{ts1}$, $C_{ts2}$, $C_{ts4}$, $C_{ts5}$, $C_{ts7}$, $C_{ts8}$ each having a value of negative two because the bit value in timeslots $t_{s1}$, $t_{s2}$, $t_{s4}$, $t_{s5}$, $t_{s7}$, $t_{s8}$ is 0; and $C_{ts3}$, $C_{ts8}$ having a value of positive eight because the bit value in timeslot $t_{s3}$, $t_{s8}$ is 1. The products respectively output from the multipliers 904 are $P_{ts1}$ having a value of zero, $P_{ts2}$ having a value of negative twelve, $P_{ts3}$ having a value of zero, $P_{ts4}$ having a value of negative two, $P_{ts5}$ having a value of zero, $P_{ts6}$ having a value of zero, $P_{ts7}$ having a value of negative fourteen, and $P_{ts8}$ having a value of positive eight. The sums respectively output from the adders 908 are $S_1$ having a value of negative twelve, $S_2$ having a value of negative two, $S_3$ having a value of zero, and $S_4$ having a value of negative six. Accordingly, the correlation coefficient $S_{Total}$ is negative twenty. Since negative twenty is less than the threshold thr having a value of four hundred, a determination is made that the synchronization word or pattern has not been detected with the given amount of likelihood. Therefore, the correlation process is repeated using a new set of soft values. The present solution is not limited to the particulars of this exemplary scenario. In this regard, it should be noted that the present solution can be used with synchronization words or patterns of any lengths selected in accordance with a given application (e.g., 64-256 bits long). The length helps to decrease the likelihood of the synchronization pattern occurring in the payload.

Figure 11:
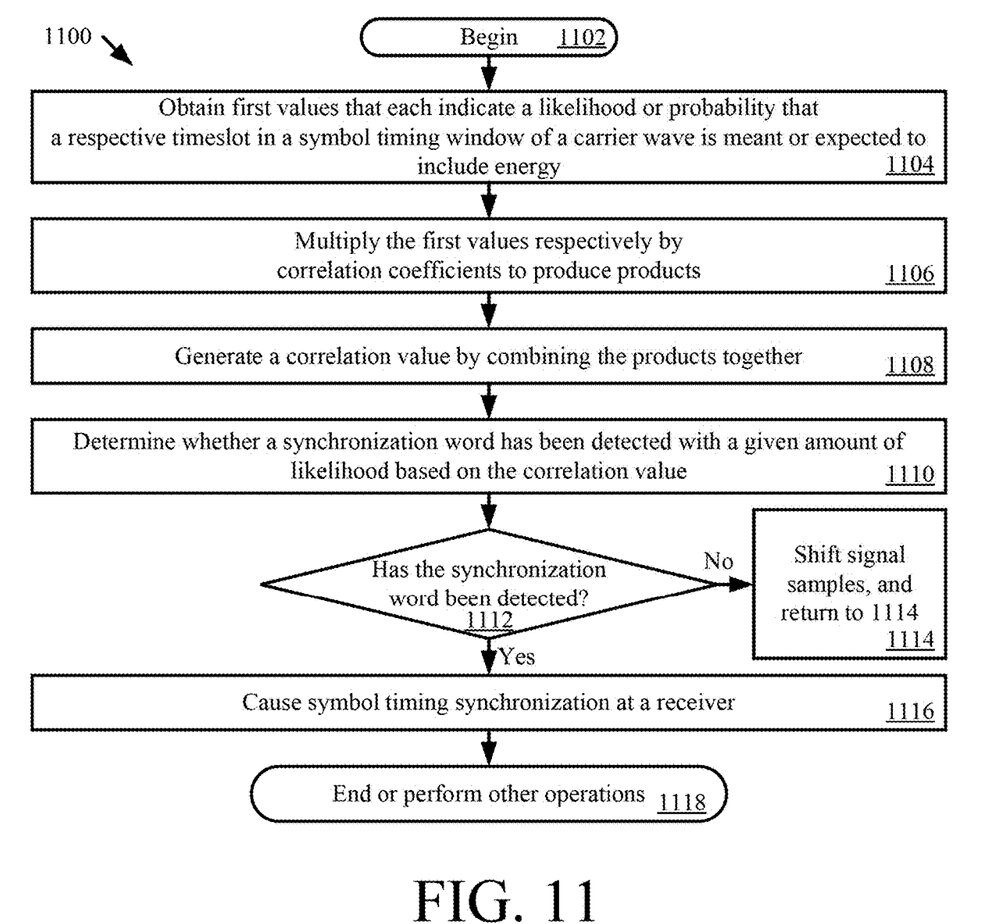
FIG. 11 provides an illustration for operating a receiver.

Referring now to FIG. 11, there is provided a flow diagram of an illustrative method 1100 for synchronization word correlation. Method 1100 can be performed by correlator 350 of FIG. 3. Method 1100 begins with 1102 and continues with 1104 where first values (e.g., soft values $SV_{ts1}$, $SV_{ts2}$, $SV_{ts3}$, $SV_{ts4}$, $SV_{ts5}$, $SV_{ts6}$, ..., $SV_{tsN-1}$, $SV_{tsN}$ of FIG. 9) are obtained. Each first value indicates a likelihood or probability that a respective timeslot (e.g., timeslot $ts_1$, $ts_2$, $ts_3$, $ts_4$, $ts_5$, $ts_6$, $ts_8$, $ts_9$ of FIG. 8) in a symbol timing window (e.g., symbol timing window 800 of FIG. 8) of a carrier wave (e.g., optical carrier wave 806 of FIG. 8) is meant or expected to include light or energy. In 1106, the first values are multiplied by correlation coefficients (e.g., correlation coefficients $C_{ts1}$, $C_{ts2}$, $C_{ts3}$, $C_{ts4}$, $C_{ts5}$, $C_{ts6}$, ..., $C_{tsN-1}$, $C_{tsN}$ of FIG. 9) to produce a plurality of products (e.g., products $P_{ts1}$, $P_{ts2}$, $P_{ts3}$, $P_{ts4}$, $P_{ts5}$, $P_{ts6}$, ..., $P_{tsN-1}$, $P_{tsN}$ of FIG. 9).

At least one of the correlation coefficients comprises a negative coefficient value. The negative correlation coefficient value is employed to cause the correlation value to be penalized when carrier wave energy exists in a timeslot that should not have any carrier wave energy. Thus, the negative correlation coefficient value is used in 1106 when light or energy should not be present in the respective timeslot of the symbol timing window. At least another one of the correlation coefficients comprises a positive coefficient value. The positive correlation coefficient value is used in 1106 when light or energy should be present in the respective timeslot of the symbol timing window. In some scenarios, an absolute value of the positive coefficient value is greater than an absolute value of the negative coefficient value, and/or a distance between the positive coefficient value and the negative coefficient value is equal to or greater than three.

In 1108, a correlation value is generated by combining the products together. The correlation value is then used in 1110 to make a determination as to whether the synchronization word or pattern has been detected with a given amount of likelihood. This determination can be made by comparing the correlation value to a threshold value. A determination is made that the synchronization word has been detected with the given amount of likelihood when the correlation value is exceeds the threshold value. A determination is made that the synchronization word has not been detected with the given amount of likelihood when the correlation value is less than the threshold value.

If a determination is made that the synchronization word has not been detected with the given amount of likelihood [1112:NO], then the signal samples are shifted and method 1100 returns to 1104 so that another iteration of the correlation process can be performed. If a determination is made that the synchronization word has been detected with the given amount of likelihood [1112:YES], then symbol timing synchronization at a receiver is caused as shown by 1116. Subsequently, 1118 is performed where method 1100 ends or other operations are performed.

Figure 12:
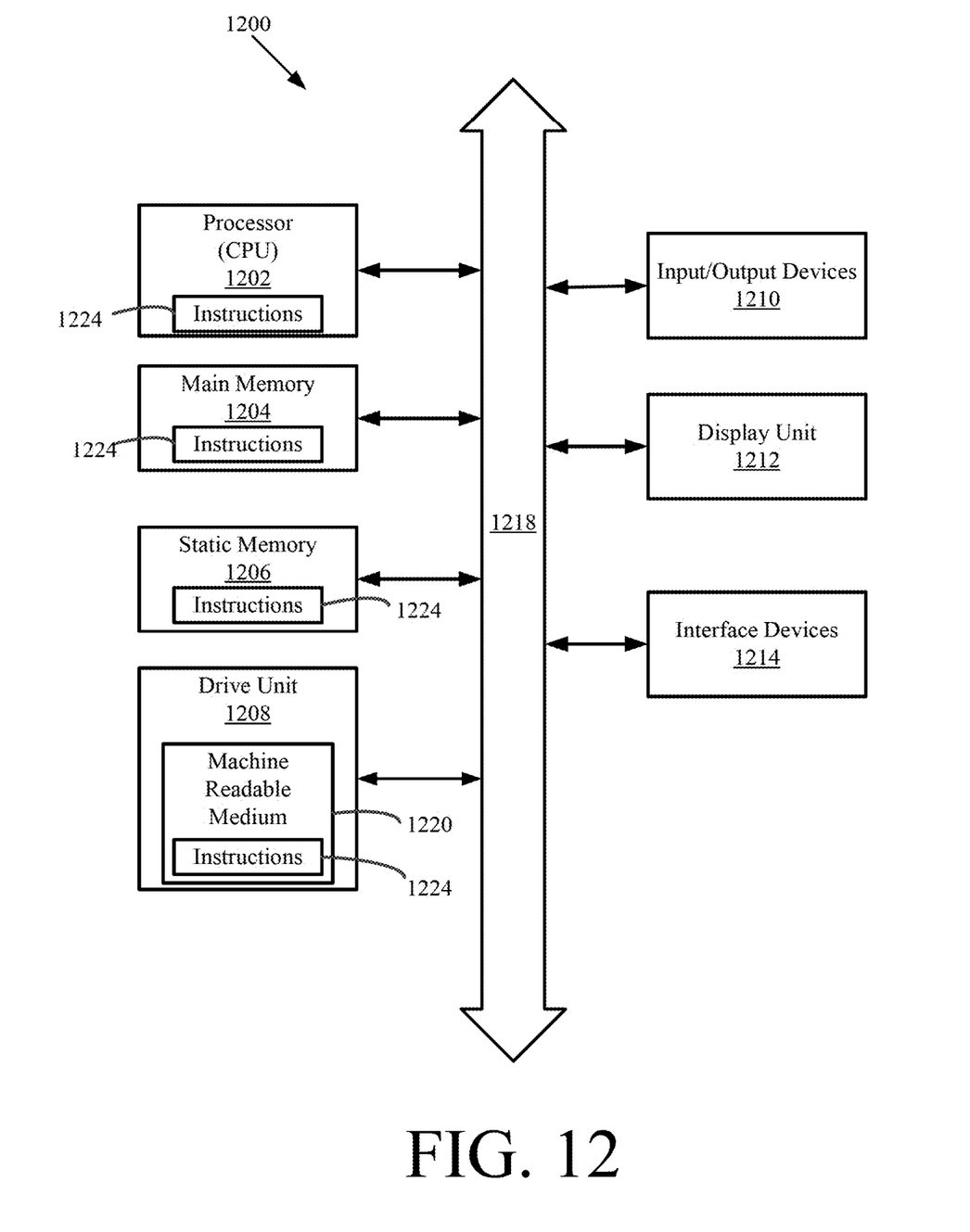
FIG. 12 provides an illustration of an architecture for a computing device.

Referring now to FIG. 12, there is shown a hardware block diagram comprising an example computer system 1200 that can be used for implementing all or part of network nodes 102-108 of FIG. 1 and/or communication device 200 of FIG. 2. The machine can include a set of instructions which are used to cause the circuit/computer system to perform any one or more of the methodologies discussed herein. While only a single machine is illustrated in FIG. 12, it should be understood that in other scenarios the system can be taken to involve any collection of machines that individually or jointly execute one or more sets of instructions as described herein.

The computer system 1200 is comprised of a processor 1202 (e.g., a Central Processing Unit (CPU)), a main memory 1204, a static memory 1206, a drive unit 1208 for mass data storage and comprised of machine readable media 1220, input/output devices 1210, a display unit 1212 (e.g., a Liquid Crystal Display (LCD)) or a solid state display, and one or more interface devices 1214. Communications among these various components can be facilitated by means of a data bus 1218. One or more sets of instructions 1224 can be stored completely or partially in one or more of the main memory 1204, static memory 1206, and drive unit 1208. The instructions can also reside within the processor 1202 during execution thereof by the computer system. The input/output devices 1210 can include a keyboard, a multi-touch surface (e.g., a touchscreen) and so on. The interface device(s) 1214 can be comprised of hardware components and software or firmware to facilitate an interface to external circuitry. For example, in some scenarios, the interface devices 1214 can include one or more Analog-to-Digital (A/D) converters, Digital-to-Analog (D/A) converters, input voltage buffers, output voltage buffers, voltage drivers and/or comparators. These components are wired to allow the computer system to interpret signal inputs received from external circuitry, and generate the necessary control signals for certain operations described herein.

The drive unit 1208 can comprise a machine readable medium 1220 on which is stored one or more sets of instructions 1224 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include solid-state memories, Electrically Erasable Programmable Read-Only Memory (EEPROM) and flash memory devices. A tangible medium as described herein is one that is non-transitory insofar as it does not involve a propagating signal.

Computer system 1200 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for synchronize word correlation, comprising:
   obtaining, by a correlator, first values that each indicate a likelihood or probability that a respective timeslot in a symbol timing window of a carrier wave is meant or expected to include energy;
   multiplying, by the correlator, the first values respectively by correlation coefficients to produce a plurality of products, wherein at least one of the correlation coefficients comprises a negative coefficient value;
   generating, by the correlator, a correlation value by combining the products together;
   determining, by the correlation, whether a synchronization word has been detected with a given amount of likelihood based on the correlation value; and
   causing, by the correlator, symbol timing synchronization at a receiver when a determination is made that the synchronization word has been detected with the given amount of likelihood based on the correlation value.

2. The method according to claim 1, wherein the at least one correlation coefficient having the negative value causes the correlation value to be penalized when carrier wave energy exists in a timeslot that should not have any carrier wave energy.

3. The method according to claim 1, wherein the negative coefficient value is used in said multiplying when energy should not be present in the respective timeslot of the symbol timing window.

4. The method according to claim 1, wherein at least another one of the correlation coefficients comprises a positive coefficient value.

5. The method according to claim 4, wherein the positive coefficient value is used in said multiplying when energy should be present in the respective timeslot of the symbol timing window.

6. The method according to claim 4, wherein an absolute value of the positive coefficient value is greater than an absolute value of the negative coefficient value.

7. The method according to claim 4, wherein a distance between the positive coefficient value and the negative coefficient value is equal to or greater than three.

8. The method according to claim 1, wherein said determining comprises comparing the correlation value to a threshold value.

9. The method according to claim 8, wherein a determination is made that the synchronization word has been detected with the given amount of likelihood when the correlation value is exceeds the threshold value.

10. The method according to claim 8, wherein a determination is made that the synchronization word has not been detected with the given amount of likelihood when the correlation value is less than the threshold value.

11. A system, comprising:
    a processor;
    a non-transitory computer-readable storage medium comprising programming instructions that are configured to cause the processor to implement a method for synchronize word correlation, wherein the programming instructions comprise instructions to:
      obtain first values that each indicate a likelihood or probability that a respective timeslot in a symbol timing window of a carrier wave is meant or expected to include energy;
      multiply the first values respectively by correlation coefficients to produce a plurality of products, wherein at least one of the correlation coefficients comprises a negative coefficient value;
      generate a correlation value by combining the products together;
      determine whether a synchronization word has been detected with a given amount of likelihood based on the correlation value; and
      cause symbol timing synchronization at a receiver when a determination is made that the synchronization word has been detected with the given amount of likelihood based on the correlation value.

12. The system according to claim 11, wherein the at least one correlation coefficient having the negative value causes the correlation value to be penalized when carrier wave energy exists in a timeslot that should not have any carrier wave energy.

13. The system according to claim 11, wherein the negative coefficient value is used in multiplication operations when energy should not be present in the respective timeslot of the symbol timing window.

14. The system according to claim 11, wherein at least another one of the correlation coefficients comprises a positive coefficient value.

15. The system according to claim 14, wherein the positive coefficient value is used in multiplication operations when energy should be present in the respective timeslot of the symbol timing window.

16. The system according to claim 14, wherein an absolute value of the positive coefficient value is greater than an absolute value of the negative coefficient value.

17. The system according to claim 14, wherein a distance between the positive coefficient value and the negative coefficient value is equal to or greater than three.

18. The system according to claim 11, wherein the determination as to whether a synchronization word has been detected with a given amount of likelihood comprises comparing the correlation value to a threshold value.

19. The system according to claim 18, wherein a determination is made that the synchronization word has been detected with the given amount of likelihood when the correlation value is exceeds the threshold value.

20. The system according to claim 18, wherein a determination is made that the synchronization word has not been detected with the given amount of likelihood when the correlation value is less than the threshold value.

* * * * *